(12) United States Patent
Abe

(10) Patent No.: US 7,195,275 B2
(45) Date of Patent: Mar. 27, 2007

(54) AIRBAG AND AIRBAG APPARATUS

(75) Inventor: Kazuhiro Abe, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/348,365

(22) Filed: Feb. 7, 2006

(65) Prior Publication Data

US 2006/0175819 A1  Aug. 10, 2006

(30) Foreign Application Priority Data

Feb. 9, 2005 (JP) ............................ 2005-033275
Jan. 17, 2006 (JP) ............................ 2006-008863

(51) Int. Cl.
*B60R 2/233* (2006.01)

(52) U.S. Cl. .................... 280/729; 280/743.2

(58) Field of Classification Search ............ 280/728.1, 280/729, 730.1, 743.1, 743.2
See application file for complete search history.

(56) References Cited

U.S. PATENT DOCUMENTS

| 5,358,273 | A | 10/1994 | Onishi et al. | |
|---|---|---|---|---|
| 5,934,701 | A * | 8/1999 | Furukawa | 280/730.1 |
| 6,042,147 | A | 3/2000 | Nishijima et al. | |
| 6,361,072 | B1 * | 3/2002 | Barnes | 280/743.1 |
| 6,536,801 | B2 * | 3/2003 | Frisch | 280/743.1 |
| 6,655,714 | B2 * | 12/2003 | Fellhauer et al. | 280/743.1 |
| 6,695,344 | B2 | 2/2004 | Hauer | |
| 6,726,245 | B2 * | 4/2004 | Fellhauer et al. | 280/743.2 |
| 6,883,832 | B2 | 4/2005 | Keutz | |
| 6,913,283 | B2 | 7/2005 | Heym | |
| 2002/0005632 | A1 * | 1/2002 | Bohn et al. | 280/728.3 |
| 2002/0105171 | A1 * | 8/2002 | Fellhauer et al. | 280/728.2 |
| 2003/0034637 | A1 * | 2/2003 | Wang et al. | 280/729 |
| 2003/0042717 | A1 | 3/2003 | Hauer | |
| 2003/0141702 | A1 * | 7/2003 | Keutz | 280/728.1 |
| 2004/0119271 | A1 * | 6/2004 | Webber | 280/731 |
| 2004/0145161 | A1 * | 7/2004 | Hasebe et al. | 280/729 |
| 2004/0245751 | A1 | 12/2004 | Marotzke et al. | |
| 2005/0104351 | A1 | 5/2005 | Lorenz | |
| 2005/0212275 | A1 * | 9/2005 | Hasebe | 280/743.1 |

FOREIGN PATENT DOCUMENTS

| EP | 1 452 403 | 9/2004 |
|---|---|---|
| EP | 1 580 083 | 9/2005 |

* cited by examiner

*Primary Examiner*—David R. Dunn
*Assistant Examiner*—Leonard McCreary, Jr.
(74) *Attorney, Agent, or Firm*—Manabu Kanesaka

(57) ABSTRACT

An airbag includes, when expanded, a center portion of an occupant-side front panel that is stretched by tethers toward a rear side of the airbag. The concave portion formed at the center portion of the front panel caves to the rear side of the airbag from a peripheral portion of the front panel. A covering lid panel traverses the concave portion. The airbag efficiently protects an occupant, even though the concave portion caves away from the occupant. Because the airbag has a volume that is smaller to the extent of the concave portion, the airbag immediately expands even when a gas generator with relatively low output is used.

9 Claims, 8 Drawing Sheets

AIRBAG AND AIRBAG APPARATUS

BACKGROUND OF THE INVENTION AND RELATED ART STATEMENT

The present invention relates to an airbag and an airbag apparatus in which the airbag is expanded in a manner such that, at least one part of a face of the airbag facing an occupant has a shape caved from a peripheral portion of the airbag in a direction to be spaced from the occupant. More particularly, the invention relates to an airbag and an airbag apparatus that is preferably used with a driver-side seat.

An airbag apparatus for use in a driver-seat of a motor vehicle is provided with an airbag, a retainer that holds the airbag on a steering wheel, a gas generator that expands the airbag, and a module cover that is attached to the retainer in a manner so as to cover the airbag being folded. In the event of a crash of the motor vehicle, the airbag pushes open the module cover and is expanded to a front face side of the steering wheel (to a side of an occupant seated on a driver-side seat), and protects the occupant seated on the driver-side seat.

In U.S. Pat. No. 6,695,344, an airbag apparatus is described, in which a center portion of a face of the airbag, when expanded, facing the occupant is formed to be a concave portion caved from a peripheral portion of the airbag in a direction to be spaced from the occupant. In the airbag apparatus of U.S. Pat. No. 6,695,344, a center portion of the face of the airbag facing the occupant is fixed to the retainer by a center portion of the module cover (or by a fixing member disposed at the center portion of the module cover).

Further, in the airbag apparatus of U.S. Pat. No. 6,695,344, the module cover is disunited between the center portion thereof and a peripheral portion thereof, when the airbag is expanded, and only the peripheral portion of the module cover is brought to be opened. At that time, the center portion of the module cover remains at a front face of the retainer and the center portion of the face of the airbag facing the occupant is pressed to the retainer by the center portion of the module cover or the fixing member.

In the airbag apparatus in U.S. Pat. No. 6,695,344, because an expansion amount of the airbag to an occupant side of a center portion of a face of the airbag facing the occupant is limited, the airbag is prevented from being expanded to the occupant side thereof in a rapidly protruding manner. In addition, the airbag is thereby accelerated to be expanded in a lateral direction (radial direction) of the airbag and the airbag is immediately extended to a wide area. Further, volume of this airbag is made smaller to the extent of the shape of the airbag, which is caved at a center portion of the face of the airbag facing the occupant in the manner described above. Accordingly, the airbag can be immediately expanded even when a gas generator having relatively low output is employed.

In the airbag apparatus disclosed in U.S. Pat. No. 6,695,344, there is a possibility that a body of an occupant intrudes into a concave portion at a face of the airbag facing the occupant, when the airbag is expanded. In this case, a peripheral portion of the concave portion is deformed in a manner such that the same buckles by compression in a direction to open the concave portion and, as a result, there is a possibility that the body of the occupant is not firmly caught.

In the airbag apparatus disclosed in U.S. Pat. No. 6,695,344, because the center portion of the face of the airbag facing the occupant is fixed to a retainer by the center portion of a module cover or by a fixing member disposed at the center portion of the module cover, the configuration of the airbag apparatus becomes complicated and assembly work for the airbag apparatus becomes bothersome, resulting in a high manufacturing cost. In addition, because of the increased number of parts, the weight of the airbag apparatus becomes great.

Accordingly, it is an object of the present invention to provide an airbag having high protection characteristics even though at least one part of a face of the airbag facing an occupant has a concave portion caved in a direction to be spaced from the occupant.

It is another object of the present invention to provide an airbag apparatus provided with the aforementioned airbag according to the invention.

In addition, it is another object of the present invention to provide an airbag and an airbag apparatus having a simple configuration.

Further objects and advantages of the invention will be apparent from the following description of the invention and the associated drawings.

SUMMARY OF THE INVENTION

An airbag according to one embodiment of the invention, when expanded, is provided with a panel traversing a concave portion, in which at least one part of a face facing an occupant is caved from a peripheral portion of the airbag in a direction to be spaced from the occupant to form a concave portion.

An airbag according to another embodiment of the invention, when expanded, in which at least one part of a face of the airbag facing an occupant is caved from a peripheral portion of the airbag in a direction to be spaced from the occupant to form a concave portion, each of faces of the peripheral portion of the airbag facing the concave portion is partially connected together at a position between an entrance side of the concave portion and a deepest portion of the back thereof.

In an airbag according to another embodiment of the invention, at least one part of faces of the airbag facing the occupant is connected to a side opposite to the face of the airbag facing the occupant, the at least one part of the face of the airbag facing the occupant is caved from the peripheral portion to a side opposite to the peripheral portion, to be a concave portion, when the airbag is expanded.

In an airbag according to another embodiment of the invention, a limiting device for limiting an amount of expansion in a lateral direction of the peripheral portion is provided.

In one embodiment of the invention, the limiting device is a tether that connects the concave portion side of the airbag to a side-portion of the airbag.

In another embodiment of the invention, an airbag apparatus includes an airbag expanding in a direction facing an occupant of a motor vehicle and a gas generator for expanding the airbag, wherein the airbag is the aforementioned airbag according to the invention.

In one embodiment of the invention, the airbag apparatus is for use in a driver-side seat of a motor vehicle.

According to one aspect of the embodiment in which the airbag apparatus is for use in the driver-side seat of a motor vehicle, when the airbag is in a state of being expanded, at least one of the peripheral portions of the airbag is interposed between a head portion of the occupant seated in a regular seating position of the driver's seat and an A-pillar located in front of the driver's seat.

In an airbag and an airbag apparatus according to the present invention, when a motor vehicle encounters an emergency such as a crash or the like, the gas generator is activated to blow out gas, and an airbag is expanded to face an occupant by the gas from the gas generator, and protects the occupant.

In the present invention, because at least one part of a face of the airbag facing the occupant is caved from a peripheral portion of the airbag in a direction to be spaced from the occupant to form into a concave portion, the face of the airbag facing the occupant is prevented from being expanded in a manner so as to project into an occupant-side. In addition, as a result, an expansion of the peripheral potion of the airbag is accelerated and the airbag is brought to be developed in a wide area.

Further, because the airbag is smaller by volume to the extent of the concave portion, the airbag is immediately expanded even when a gas generator with relatively low output is used.

In the airbag according to the invention, because a panel is provided in a manner so as to traverse the concave portion, a body of the occupant hitting the airbag is prevented from being deeply intruded into the concave portion. In addition, because each of the peripheral portions of the concave portion is connected to each other by the panel, the peripheral portion of the airbag is prevented from being deformed in a manner such that the same buckles by compression in a direction to open the concave portion, when the occupant falls down in the airbag. Accordingly, the body of the occupant is firmly caught by the airbag.

Further, when the occupant hits the panel, the body of the occupant is caught by the panel in a relatively soft manner.

In an embodiment of the invention, because each of the faces of the airbag facing the peripheral portion that faces the concave portion is partially connected together at a position between an entrance side of the concave portion and the deepest portion of the back thereof, the body of the occupant is also prevented from being deeply intruding into the concave portion, when the occupant hits the airbag. In addition, as a result, the peripheral portion of the airbag is prevented from being deformed in a manner such that the same buckles by compression in a direction to open the concave portion, when the occupant hits the airbag.

In one embodiment of the invention, the concave portion can be formed at a face of the expanded airbag facing the occupant with a simple configuration.

In another embodiment of the invention, the peripheral portion of the concave portion is prevented from being excessively expanded in a lateral direction.

In this case, by connecting the concave portion side of the airbag and the side-portion thereof by the tether, the peripheral portion of the airbag is prevented from being excessively expanded in a lateral direction with an extremely simple configuration. In addition, by adjusting the length of the tether, the amount of expansion of the peripheral portion in a lateral direction can be adjusted with ease.

In one embodiment of the invention, the airbag apparatus is preferably used in a driver-side seat in a motor vehicle. However, the present invention is not limited to the airbag described above.

As described above, according to one aspect of the embodiment in which the airbag apparatus is for use in the driver-side seat of a motor vehicle, the airbag is constructed such that when the airbag is expanded, at least one of peripheral portions of a concave portion of the airbag is interposed between a head portion of the occupant seated in the driver's seat and an A-pillar located in front of the driver's seat. (Namely, the airbag is expanded in a manner so as to fill up space between the head portion of the occupant seated in the driver's seat and the A-pillar.) The head of the occupant can thereby be prevented or restrained from hitting the A-pillar, when a motor vehicle encounters a crash (especially, an oblique front crash).

Incidentally, as described above, it is necessary to enlarge an expanding amount of the airbag up to a considerable size toward the peripheral portion thereof so that the peripheral portion of the concave portion of the expanded airbag is interposed between the head portion of the occupant seated in the driver's seat and the A-pillar. As a result, the airbag is brought to a state of appearing to have a large volume. However, in practice in the present invention, since a concave portion is formed in the airbag, the volume of the gas for expanding the airbag, to be led from the gas generator, can be decreased to the extent of the concave portion. Accordingly, in the aforementioned configuration, the airbag can also be rapidly expanded without employing an excessively high-output gas generator.

DETAILED DESCRIPTION OF THE PREFERRED EMBODIMENTS

Figure 1:
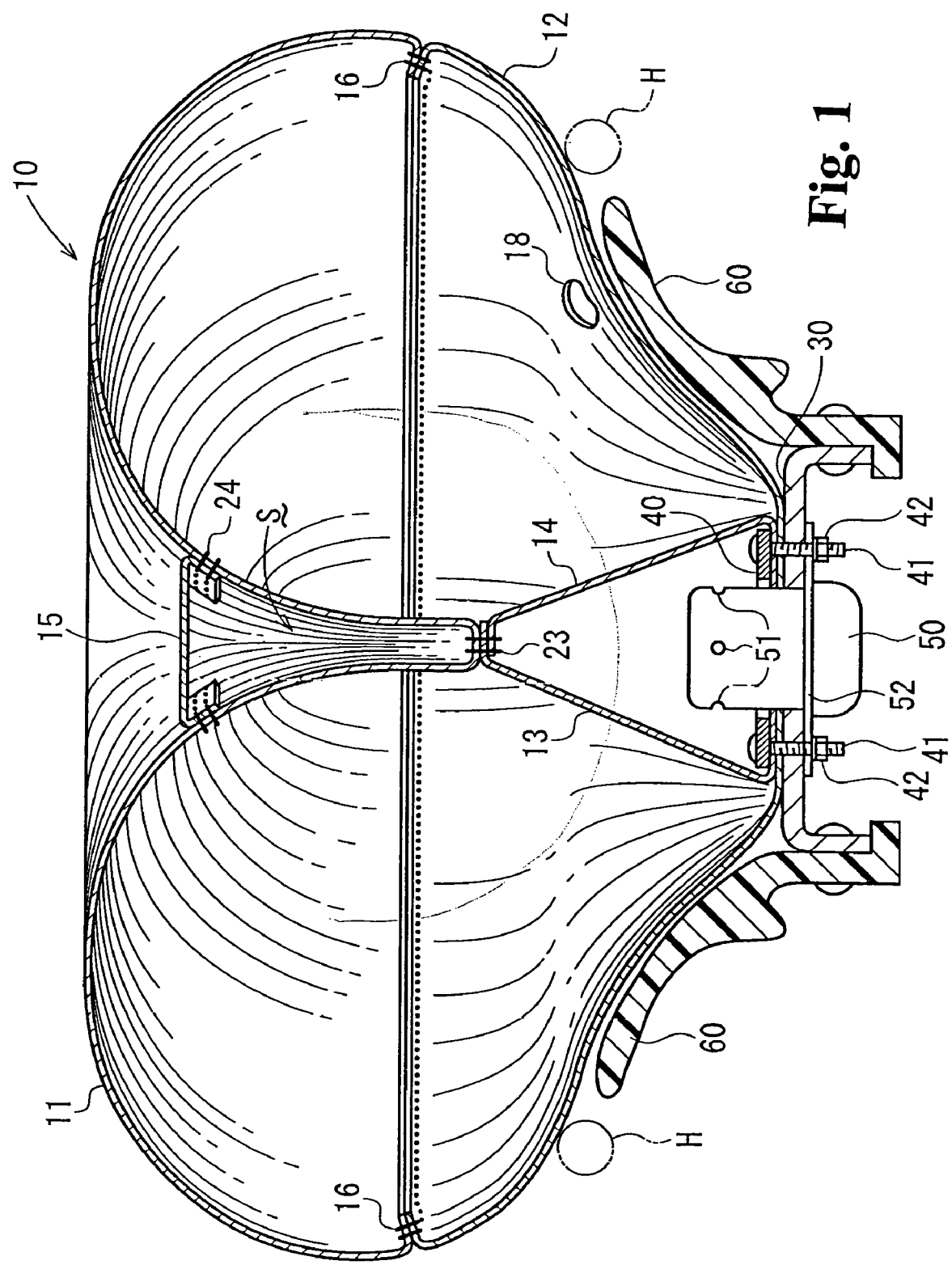
FIG. 1 is a cross section illustrating an airbag and an airbag apparatus according to a first embodiment of the invention.

Referring now to the drawings, embodiments of the present invention will be described.

Figure 2:
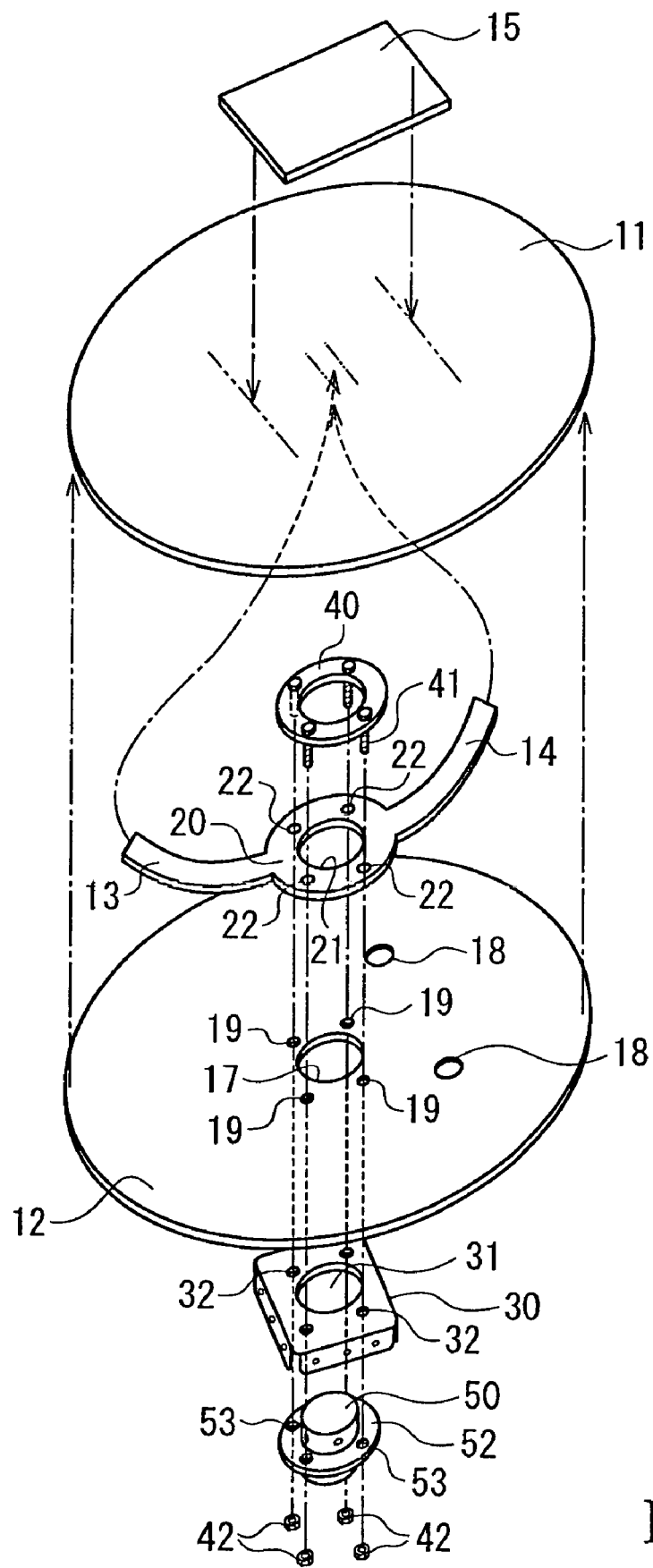
FIG. 2 is an exploded perspective view illustrating the airbag and the airbag apparatus of FIG. 1.

FIG. 1 is a cross section illustrating an airbag and an airbag apparatus according to a first embodiment of the present invention, and FIG. 2 is an exploded perspective view illustrating the airbag and the airbag apparatus.

In this embodiment, the airbag 10 is an airbag for use in a driver-side seat of a motor vehicle. The airbag 10 is provided with a front panel 11 that constitutes a face of the airbag facing an occupant, a rear panel 12 that constitutes an outer face of the airbag opposite to the face of the airbag (rear side of the airbag) facing the occupant, tethers 13 and 14 that allow a center portion of the front panel 11 to be connected to the rear side of the airbag 10, and a covering lid panel 15 that traverses a concave portion S formed from the center portion of the front panel 11, when the airbag 10 is expanded, being stretched by the tethers 13 and 14 toward the rear side thereof.

Each of the front panel 11 and the rear panel 12 is made of woven material having a round shape and is formed into a bag shape by stitching each of outer peripheral portions of the airbag by a seam 16. The stitched portion has a circular-ring-shape that circulates along an outer periphery of the front panel 11 and the rear panel 12. In addition, the seam 16 is formed from a thread or the like, although not limited to the same.

The rear panel 12 is provided with an opening 17 for an inflator (gas generator) and a venthole 18. The opening 17 for the inflator is disposed at a center of the rear panel 12. A bolt penetrating-hole 19 is disposed around the opening 17 for the inflator.

A ring-shaped patch cloth 20 is disposed from inside the airbag 10 toward a peripheral portion of the opening 17 for the inflator. The patch cloth 20 has an inner hole 21 having an approximately the same diameter as that of the opening 17 for the inflator and a bolt penetrating-hole 22 formed in an overlapping positional relationship to the bolt penetrating-hole 19 around the inner hole 21. In addition, in this embodiment, the patch cloth 20 is pressed to the peripheral portion of the opening 17 for the inflator by a pressing ring 40, described later. However the patch cloth 20 may be stitched in advance onto the peripheral portion of the opening 17 for the inflator.

The two tethers 13 and 14 are provided in an internal part of the airbag 10. In this embodiment, one end of each of the tethers 13 and 14 is combined with an outer peripheral portion of the patch cloth 20 and the other end thereof is stitched on the vicinity of the center portion of the front panel 11. The tethers 13 and 14 are disposed to be positioned opposite to each other by sandwiching a center of the patch cloth 20.

However, the number of the tethers, the disposition, and the structure of the tethers to be attached to the airbag 10 is not limited to the above-described. The one end of each of the tethers 13 and 14 may be directly stitched on the rear panel 12. In this embodiment, each of the other ends of the tethers 13 and 14 is stitched on the vicinity of the center portion of the front panel 11 by a common seam 23, being overlapped with each other. However, each of the tethers 13 and 14 may be individually stitched on the front panel 11, being disposed at a position to be slightly spaced from the center portion.

The aforementioned covering lid panel 15 is made of woven material having an approximately rectangular shape in this embodiment. The covering lid panel 15 is disposed in a manner so as to traverse the vicinity of the center portion of an outer face side of the front panel 11 and both ends of the covering lid panel 15 are stitched on a position being spaced at a predetermined distance from the center portion (seam 23) of the front panel 11 by a seam 24.

The covering lid panel 15 is designed to have a size smaller than that for sealing the aforementioned concave portion S resulting in allowing an inside of the concave portion S to communicate with the ambient air.

However, the shape of the covering lid panel 15 is not limited to that shown in, for example, FIG. 2. For example, as for the shape of the covering lid panel 15, various kinds of the shape, such as a round shape, a polygon, a star-shape, or the like can be employed. Further, the shape of the covering lid panel 15 may be that similar to the tether (a strap shape or a belt shape). There is also no specific limitation for material of the covering lid panel 15 and woven material, the same material as that for the front panel 11 or the like, a net-like, or a mesh-like shape may be also applicable.

The covering lid panel 15 is preferable to be positioned at a side closer to an entrance of the concave portion (occupant side) than the midpoint of the depth of the concave portion S.

The airbag 10 can be attached to a retainer 30 using the pressing ring 40.

An inflator attaching hole 31 is provided in the retainer 30 (refer to FIG. 2). The aforementioned opening 17 for the inflator of the rear panel 12, an inner hole 21 of the patch cloth 20, and an inner periphery of the pressing ring 40 have approximately the same diameter as that of the inflator attaching hole 31. A bolt penetrating-hole 32 is formed in an overlapping positional relationship to each of the bolt penetrating-holes 19 and 22 of the rear panel 12 and the patch cloth 20, around the inflator attaching hole 31. Further, stud bolts 41 for penetrating the bolt penetrating-holes 19, 22, and 32 are projectingly mounted on the pressing ring 40.

An inflator 50 is fit into the inflator attaching hole 31. The inflator 50 has an approximately cylindrical shape and a plurality of gas blowing outlets 51 are provided at a tip end thereof. In this embodiment, the plurality of gas blowing outlets are disposed at even distance in a peripheral direction of the inflator 50 and the gas is allowed to blow out from each of the gas blowing outlets 51 in a radial direction. A flange 52 is formed around a side peripheral face of the inflator 50. In the flange 52, bolt penetrating-holes 53 are formed in an overlapping positional relationship to each of the bolt penetrating-holes 19, 22, and 32.

When the airbag 10 is attached to the retainer 30, the patch cloth 20 is overlapped with a peripheral portion of the opening 17 for inflator and both of the patch cloth 20 and the opening 17 for inflator are pressed to a peripheral portion of the inflator attaching hole 31 by the pressing ring 40. In addition, from an opposite side of the inflator attaching hole 31, the tip end of the inflator 50 is inserted into the inflator attaching hole 31 and the flange 52 is overlapped with the peripheral portion of the inflator attaching hole 31. At this moment, the stud bolt 41 is penetrated through each of the bolt penetrating-holes 22, 19, 32, and 53 and a nut 42 is screwed on the stud bolt 41.

Thereby, the airbag 10 and the inflator 50 are attached to the retainer 30 and the center portion of the front panel 11 is connected to a rear side of the airbag 10 via each of the tethers 13 and 14, and the patch cloth 20.

By folding the airbag 10 and attaching the module cover 60 to the retainer 30 in a manner so as to cover the folded airbag 10, an airbag apparatus for use in the driver-side seat is configured. The airbag apparatus is mounted on a steering wheel H. Further, the module cover 60 is configured to cleave and open out, when the airbag 10 is expanded.

When the motor vehicle provided with the airbag apparatus encounters an emergency, such as a crash, or the like, the inflator is activated to blow out the gas and the airbag 10 is expanded by the inflator 50. The airbag 10 is brought to be expanded toward a front face side (a side of the occupant seated on the driver-side seat) of the steering wheel H, pushing open the module cover 60 and protects the occupant.

At this moment, the center portion of the front panel 11 is stretched to the rear side of the airbag 10 by the tethers 13 and 14 and at the center portion of the front panel 11, the concave portion S caved to the rear side of the airbag 10 from the peripheral portion thereof is formed. Thereby, the front panel 11 is prevented from being expanded in a manner so as to protrude toward the occupant side. In addition, as a result, the expansion of the peripheral portion of the concave portion S is accelerated and the airbag 10 is brought to be immediately developed to a wide area. Further, because the volume of the airbag 10 is made small to the extent of the concave portion S, the airbag 10 is immediately expanded even when the inflator 50 having a relatively low output is used.

Particularly, in this embodiment, because the concave portion S is formed in the center portion of the front panel 11, the airbag 10 is brought to be immediately expanded in the radial direction. As a result, in the peripheral portion of the airbag 10, a lower part of the concave portion S catches a waist part of the occupant earlier, and prevents the occupant from moving in a forward direction. Further, when the upper body of the occupant falls down in the airbag 10, a left-and-right side of the concave portion S in the peripheral portion firmly catches both shoulders of the occupant.

In the airbag 10, because the covering lid panel 15 is provided in a manner so as to traverse the concave portion S, the upper body of the occupant that falls down in the airbag 10, when expanded, is prevented from deeply intruding into the concave portion S. Further, because each of the peripheral portions of the concave portion S is connected by the covering lid panel 15, the peripheral portion of the airbag 10 is prevented from being deformed in a manner such that the same buckles by compression in a direction to open the concave portion S, when the upper body of the occupant falls down in the airbag 10. Accordingly, the upper body of the occupant is firmly caught by the airbag 10.

Further, when the upper body of the occupant falls down in the airbag 10, the same is caught by the covering lid panel 15 in a relatively soft manner.

In this embodiment, because the center portion of the front panel 11 of the airbag 10 is connected to the rear side thereof by the tethers 13 and 14, a configuration of the airbag apparatus is made simple. In addition, the depth of the concave portion S can be easily adjusted by adjusting the length of the tethers 13 and 14.

Figure 3:
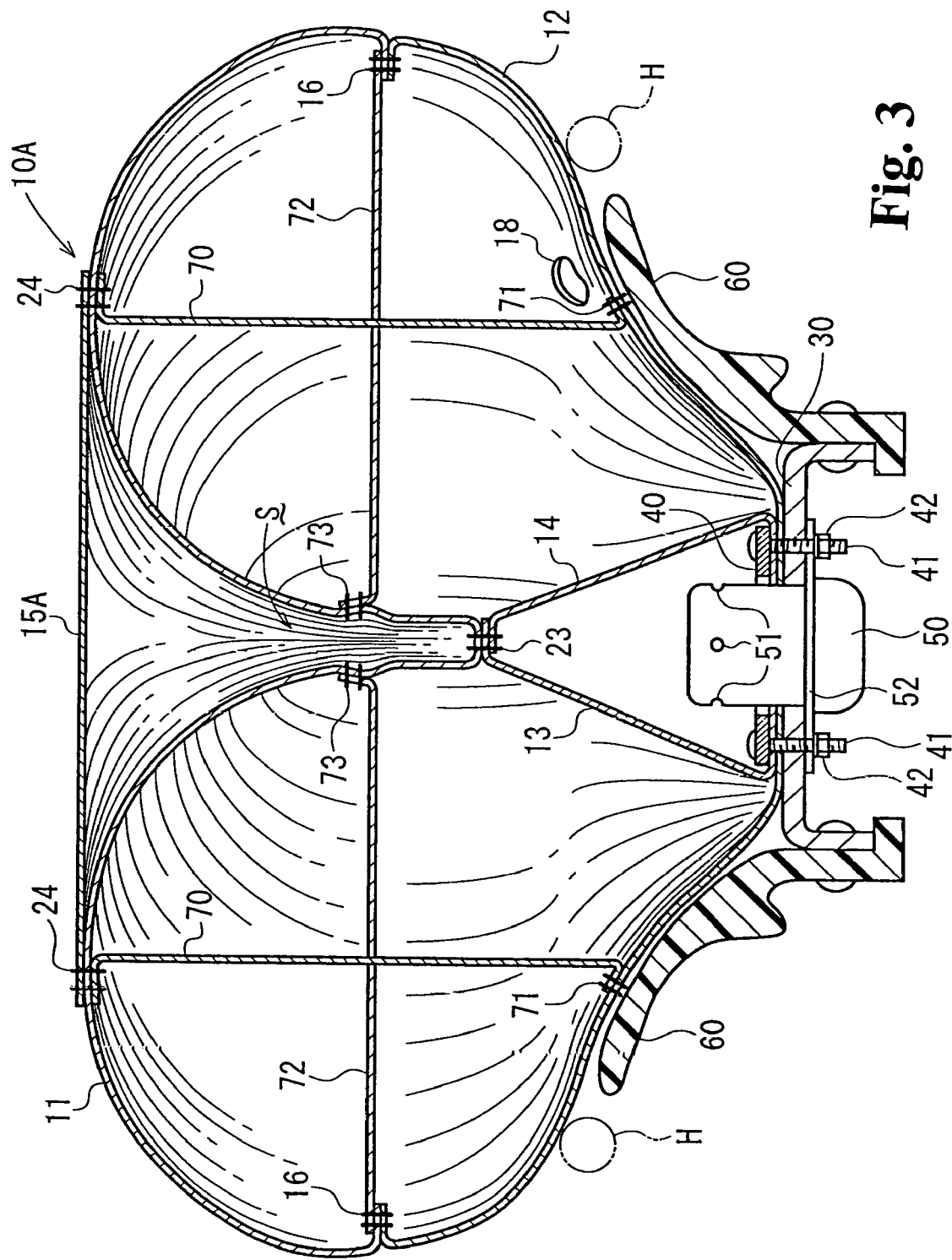
FIG. 3 is a cross section illustrating an airbag and an airbag apparatus according to a second embodiment of the invention.

FIG. 3 is a cross-section illustrating the airbag and the airbag apparatus with respect to a second embodiment of the invention.

In the airbag 10A of this embodiment, the center portion of the front panel 11 is also connected to the rear side of the airbag 10A by the tethers 13 and 14 provided inside the airbag 10A, and the center portion of the front panel 11 is stretched to the rear side of the airbag 10A resulting in forming a concave portion S, when the airbag 10A is expanded. In this embodiment, a covering lid panel 15A is also provided on an outer face side of the front panel 11 in a manner so as to traverse the concave portion S.

In this embodiment, the covering lid panel 15A traverses from one part to the other part, each of which is closest to the occupant in the peripheral portion of the concave portion S of the front panel 11, when the airbag 10A is expanded, and both end portions of the covering lid panel 15A are stitched on the parts described above by the seam 24.

In an internal part of the airbag 10A, a tether 70 is provided to serve as a limiting device for limiting an expansion amount of the peripheral portion of the front panel 11 toward the occupant side, when the airbag 10A is expanded. One end of the tether 70 is stitched on part of the peripheral portion of the front panel 11, which is expanding closest to the occupant side, by the common seam 24 used for the covering lid panel 15A, and the other end thereof is stitched on the rear panel 12 by a seam 71.

Further, in an internal part of the airbag 10A, a tether 72 is provided to serve as a limiting device for limiting an expansion amount of the peripheral portion of the front panel 11 in a lateral direction, when the airbag 10A is expanded. One end of the tether 72 is stitched adjacent to part of the front panel 11, at which the front panel 11 and the tethers 13 and 14 are combined, by a seam 73 and the other end thereof is stitched on a portion, at which each of the peripheral portions of the front panel 11 and the rear panel 12 is stitched, by a common seam 16.

A plurality of tethers 70 and 72 are disposed in a peripheral direction of the airbag 10A at a certain distance.

However, a disposition of the tethers 70 and 72, and a structure for attaching the same are not limited to the above-described embodiment.

The other configuration of the airbag 10A is identical to that of the airbag 10 described above, shown in FIGS. 1 and 2, and the same numeral in FIG. 3 denotes the same element in FIGS. 1 and 2.

The airbag 10A has an effect identical to that of the airbag 10, shown in FIGS. 1 and 2.

In the airbag 10A, because the covering lid panel 15A allows both the portions in the concave portion S of the peripheral portion of the front panel 11, closest to the occupant side of an expanded state of the airbag 10A, to be connected together, when the occupant falls down in the expanded airbag 10A, the peripheral portion of the airbag 10A is prevented from being deformed in a manner such that the same buckles by compression in a direction to open the concave portion S.

In this embodiment, because the expansion amount of the peripheral portion of the airbag 10A, when expanded, to the occupant side is limited by the tether 70, the peripheral portion of the airbag 10A is prevented from being excessively expanded in a manner so as to be projecting to the occupant side.

Further, in this embodiment, because the expansion amount of the peripheral portion of the airbag 10A, when expanded, in the lateral direction is limited by the tether 72, the peripheral portion is prevented from being excessively expanded in the lateral direction.

Further, in this embodiment, the expansion amount of the peripheral portion of the airbag 10A in the occupant side direction and in the lateral direction can be easily adjusted by adjusting the length of the tethers 70 and 72.

Figure 4:
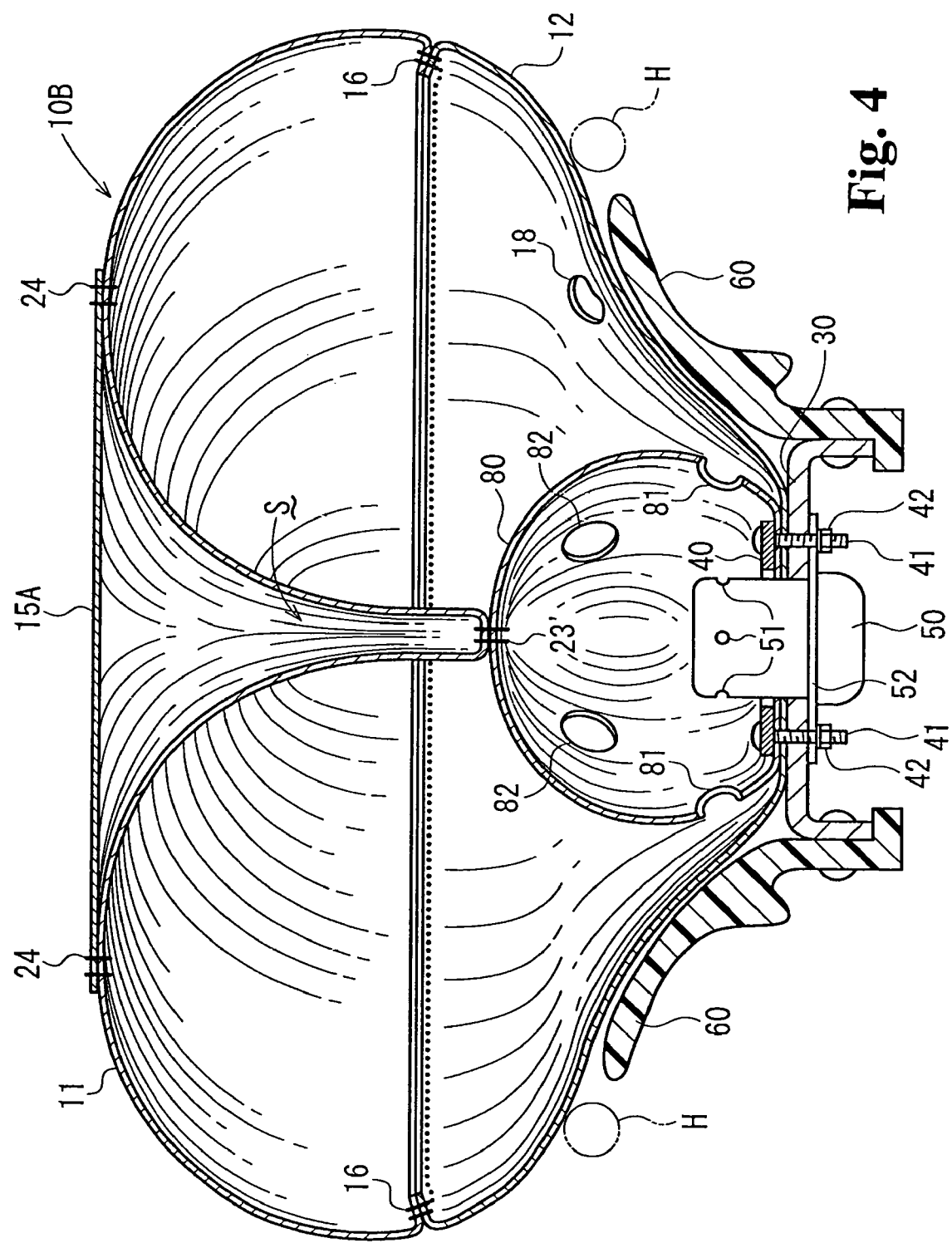
FIG. 4 is a cross section illustrating an airbag and an airbag apparatus according to a third embodiment of the invention.

FIG. 4 is a cross-section illustrating an airbag and an airbag apparatus with respect to a third embodiment of the invention.

In an internal part of an airbag 10B in this embodiment, internal bag 80 is provided instead of providing the tethers 13 and 14. The internal bag 80 is provided with an opening for an inflator (the numeral is omitted) and a plurality of continuous openings 81 and 82 allowing an inside of the internal bag 80 to be communicated with an inside of the airbag 10B. The opening for the inflator is disposed at a rear side of the internal bag 80. The continuous opening 81 is provided around the opening for the inflator and the continuous opening 82 is disposed closer to the occupant side compared to the continuous opening 81.

In this embodiment, the center portion of the front panel 11 of the airbag 10B is stitched on an end portion of the occupant side of the internal airbag 80 by a seam 23'.

By overlapping a peripheral portion of the opening for the inflator on a peripheral portion of the opening 17 for the inflator (not shown in FIG. 4. and refer to FIG. 2.) of the airbag 10B, and by fixing the same to the inflator attaching hole 31 of the retainer 30 (refer to FIG. 2.), the center portion of the front panel 11 is connected to the rear side of the airbag 10B via the internal bag 80.

Namely, in this embodiment, when the airbag 10B is expanded, the center portion of the front panel 11 is stretched to the rear side of the airbag 10B by the internal bag 80 and the concave portion S is thereby formed at the center portion of the front panel 11. In this embodiment, the covering lid panel 15A is also provided in a manner so as to traverse the concave portion S. The covering lid panel 15A is identical of that described in the second embodiment, shown in FIG. 3.

In this embodiment, the gas blowing outlet 51 of the inflator 50 is disposed in the internal bag 80 via the opening for the inflator. As described above, the plurality of gas blowing outlets are disposed in the peripheral direction of the inflator 50 at a certain distance and the gas is blown out from the gas blowing outlet in the radial direction.

The continuous opening 81 is provided on an extension line in a gas blowing out direction from each of the gas blowing outlets 51, namely at a position facing each of the gas blowing outlets 51. However, all the continuous openings 81 may be facing respective gas blowing outlets 51, or part of the continuous openings 81 may be facing respective gas blowing outlet 51. In other words, there may be a continuous opening 81 that does not face the gas blowing outlet.

The continuous opening 82 is disposed differing in a phase from the continuous opening 81 in a peripheral direction.

Other configurations of the airbag 10B are identical to the airbag 10 described above, shown in FIGS. 1 and 2.

The airbag 10B has also an effect identical to that of the airbag 10, shown in FIGS. 1 and 2.

In the airbag 10B, when the inflator 50 is activated to blow out the gas, the gas is supplied into the airbag 10B via the internal bag 80. At this moment, the gas supplied from the inflator 50 passes through the continuous opening 81 facing the gas blowing outlet 51 and blows out in a lateral direction (radial direction) into the airbag 10B. Thereby, development of the airbag 10B in the lateral direction is accelerated further.

Figure 5:
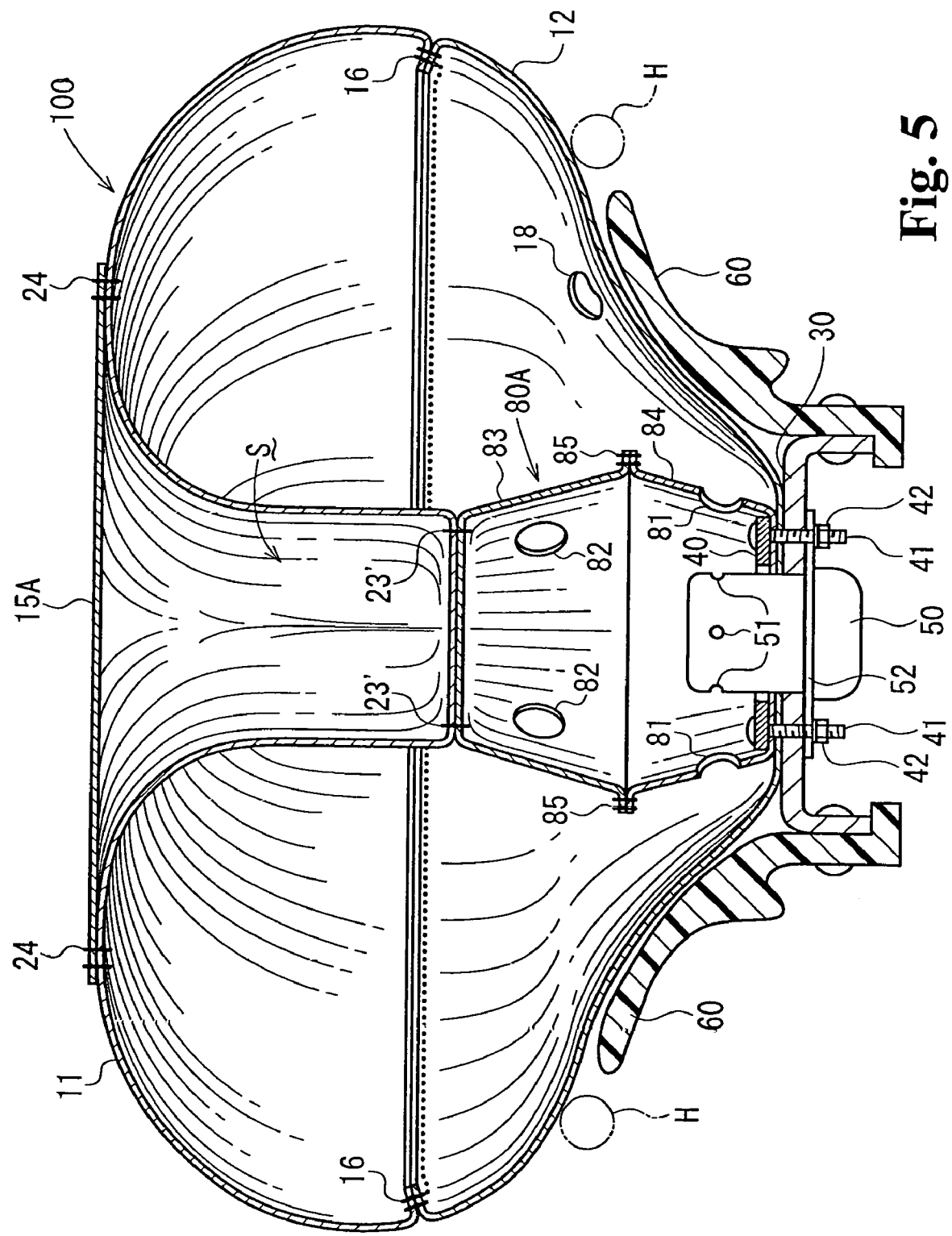
FIG. 5 is a cross section illustrating an airbag and an airbag apparatus according to a fourth embodiment of the invention.
Figure 6:
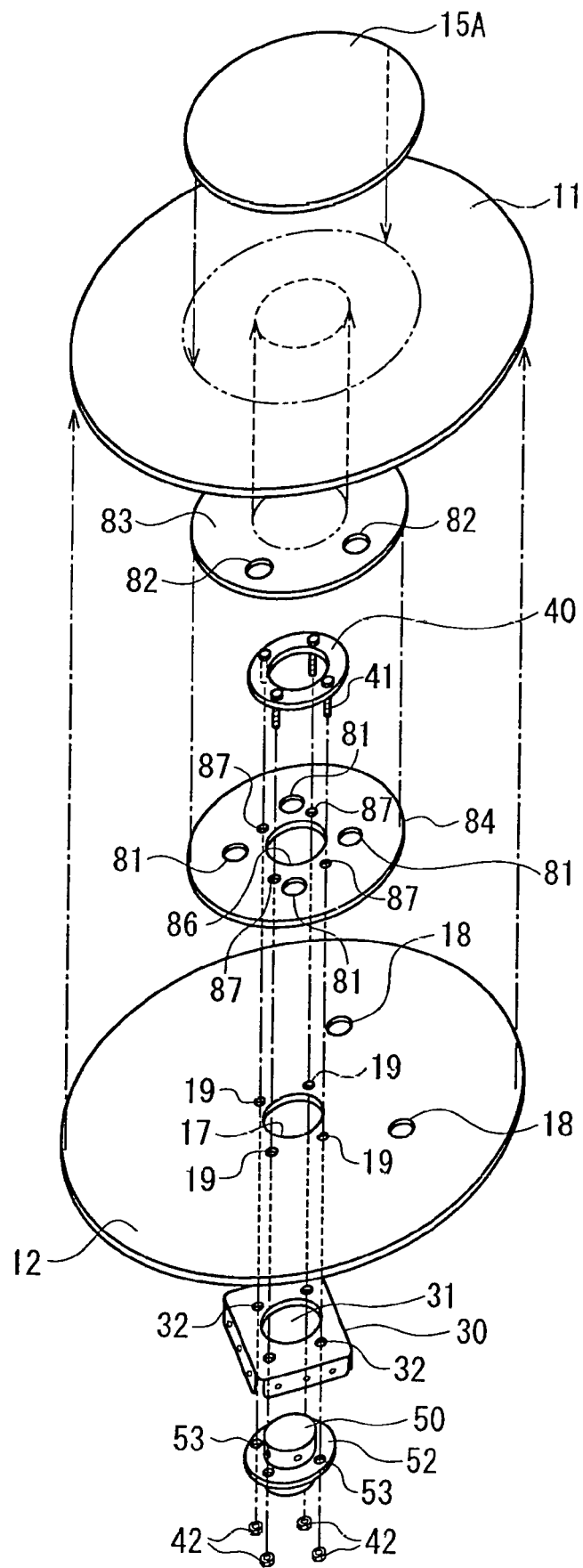
FIG. 6 is an exploded perspective view illustrating the airbag and the airbag apparatus of FIG. 5.

FIG. 5 is a cross-section illustrating an airbag and an airbag apparatus with respect to a fourth embodiment of the invention, and FIG. 6 is an exploded perspective view illustrating the airbag and the airbag apparatus.

An airbag 10C of this embodiment is also provided with the internal bag 80A. In this embodiment, the internal airbag 80A is composed of a first inner panel 83 and a second inner panel 84, each of which is made of round shaped woven material.

The first and the second inner panels 83 and 84, respectively, are disposed in an approximately concentric state with the front panel 11 and the rear panel 12 of the airbag 10C and each of the outer peripheral portions is stitched together by the seam 85. A center portion of the first inner panel 83 located at the front panel 11 side (a portion to be an occupant side end portion of the first inner panel 83 in an expanded state of the airbag 10C) is stitched on the center portion of the front panel 11 by the seam 23'.

An opening 86 for the inflator disposed in an approximately concentric state with the opening 17 for the inflator of the rear panel 12 is provided at a center portion of the second inner panel 84 located at a rear panel 12 side (a portion to be a rear side end portion of the second inner panel 84 in an expanded state of the airbag 10C). The openings 17 and 86 for the inflator have approximately the same diameter. In addition, a bolt penetrating-hole 87 being in an overlapping relationship with the bolt penetrating-hole 19 of the rear panel 12 is provided around the opening 86 for the inflator.

In this embodiment, a continuous opening 81 is provided in the second inner panel 84 and a continuous opening 82 is provided in the first inner panel 83. In this embodiment, the continuous opening 81 is also disposed at a position facing each of the gas blowing outlet 51 of the inflator 50 and the continuous opening 82 is disposed in a displaced phase relative to the continuous opening 81. However, the continuous opening 82 may be provided in the second inner panel 84.

The center portion of the front panel 11 is connected to a rear side of the airbag 10C via the first and second inner panels 83 and 84, respectively, by overlapping a peripheral edge portion of the opening 86 for the inflator of the second inner panel 84 with the peripheral edge portion of the opening 17 for the inflator of the rear panel 12, and fixing the same to the inflator attaching hole 31 of the retainer 30 by the pressing ring 40.

That is, in this embodiment, when the airbag 10C is expanded, the concave portion S is formed at the center portion of the front panel 11 by a stretching operation of the center portion of the front panel 11 toward the rear side of the airbag 10C by the first and second inner panels 83 and 84, respectively. In this embodiment, the covering lid panel 15A is also provided in a manner so as to traverse the concave portion S. The covering lid panel 15A is identical to that described in the above-described embodiment, shown in FIG. 3.

Other configurations of the airbag 10C are identical to that described above, shown in FIG. 4.

The airbag 10C also has an effect identical to that of the airbag 10B, shown in FIG. 4.

In the airbag 10C, the depth of the concave portion S can be easily adjusted by adjusting the diameter of the first and second inner panels 83 and 84, respectively, and the width or the like of the allowance (seam 85).

Figure 7:
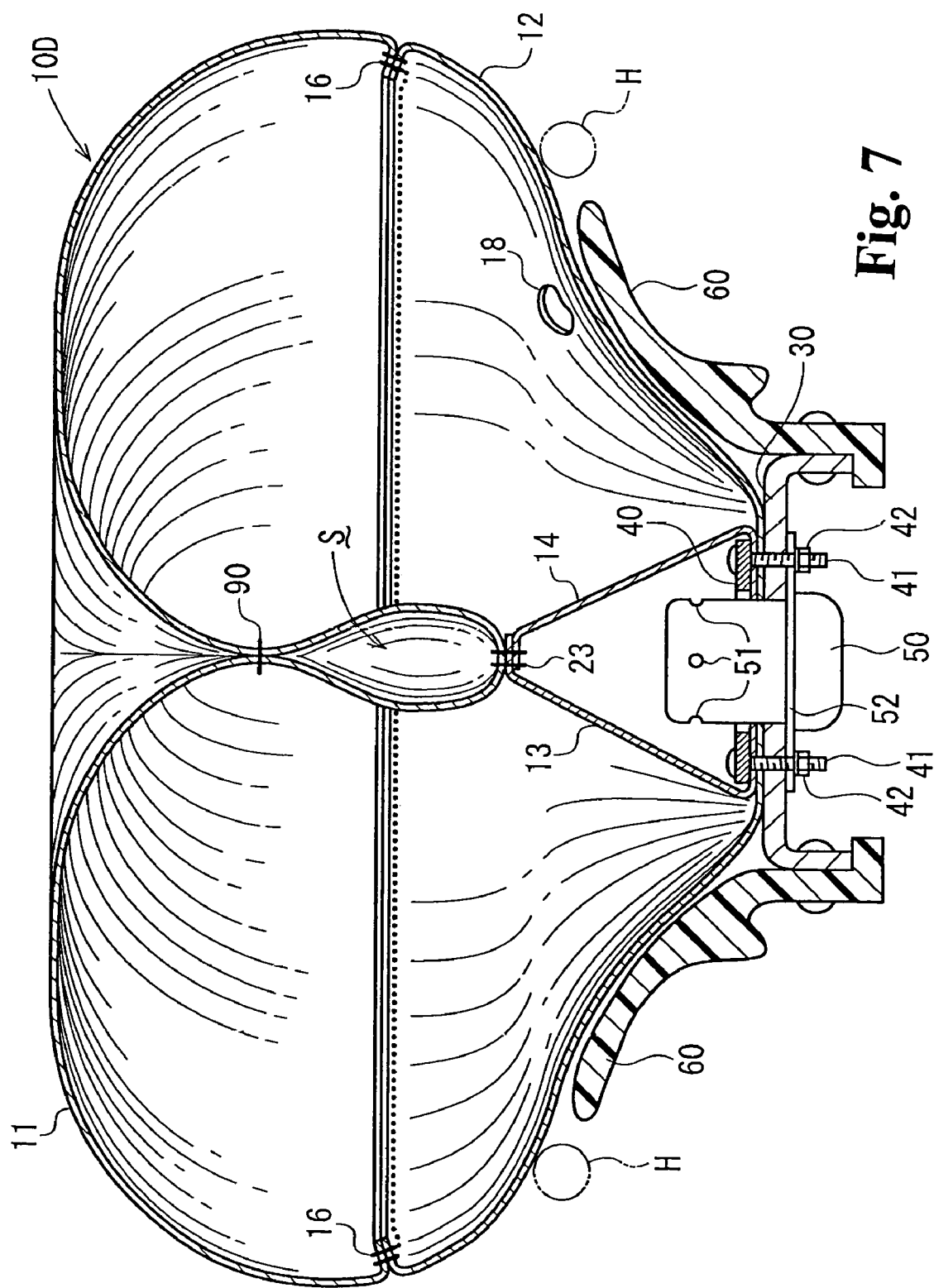
FIG. 7 is a cross section illustrating an airbag and an airbag apparatus according to a fifth embodiment of the invention.

FIG. 7 is a cross-section illustrating an airbag and an airbag apparatus according to a fifth embodiment of the invention.

In an airbag 10D of this embodiment, the center portion of the front panel 11 is connected to the rear side of the airbag 10D by the tethers 13 and 14. Accordingly, when the airbag 10D is expanded, the center portion of the front panel 11 is stretched to the rear side of the airbag 10D by the tethers 13 and 14 and the concave portion S is thereby formed.

In this embodiment, instead of providing a covering lid panel in a manner so as to traverse the concave portion S, each of the faces of the front panel 11 facing the concave portion S is partially stitched by a seam 90 on a position between an entrance side of the concave portion S and a deepest portion of the back thereof. Further, the position of the seam 90 is preferably closer to the entrance side of the concave portion S (occupant side) than to a midpoint of the depth of the concave portion S.

Other configurations of the airbag 10D are identical to the airbag 10 described above, shown in FIGS. 1 and 2.

In the airbag 10D, because each of the faces that faces the concave portion S of the front panel 11 is stitched by the seam 90, in a state of the airbag 10D being expanded, the body of the occupant is prevented from deeply intruding into the concave S. Further, because each of the peripheral portions of the concave S is connected by the seam 90, a peripheral portion of the concave portion S is prevented from being deformed in a manner such that the same buckles by compression in a direction to open the concave portion S.

Because a panel that traverses the concave portion S is not required for the airbag 10D, the structure of the airbag 10D is made simple, and the airbag 10D is manufactured easily at low cost.

Figure 8:
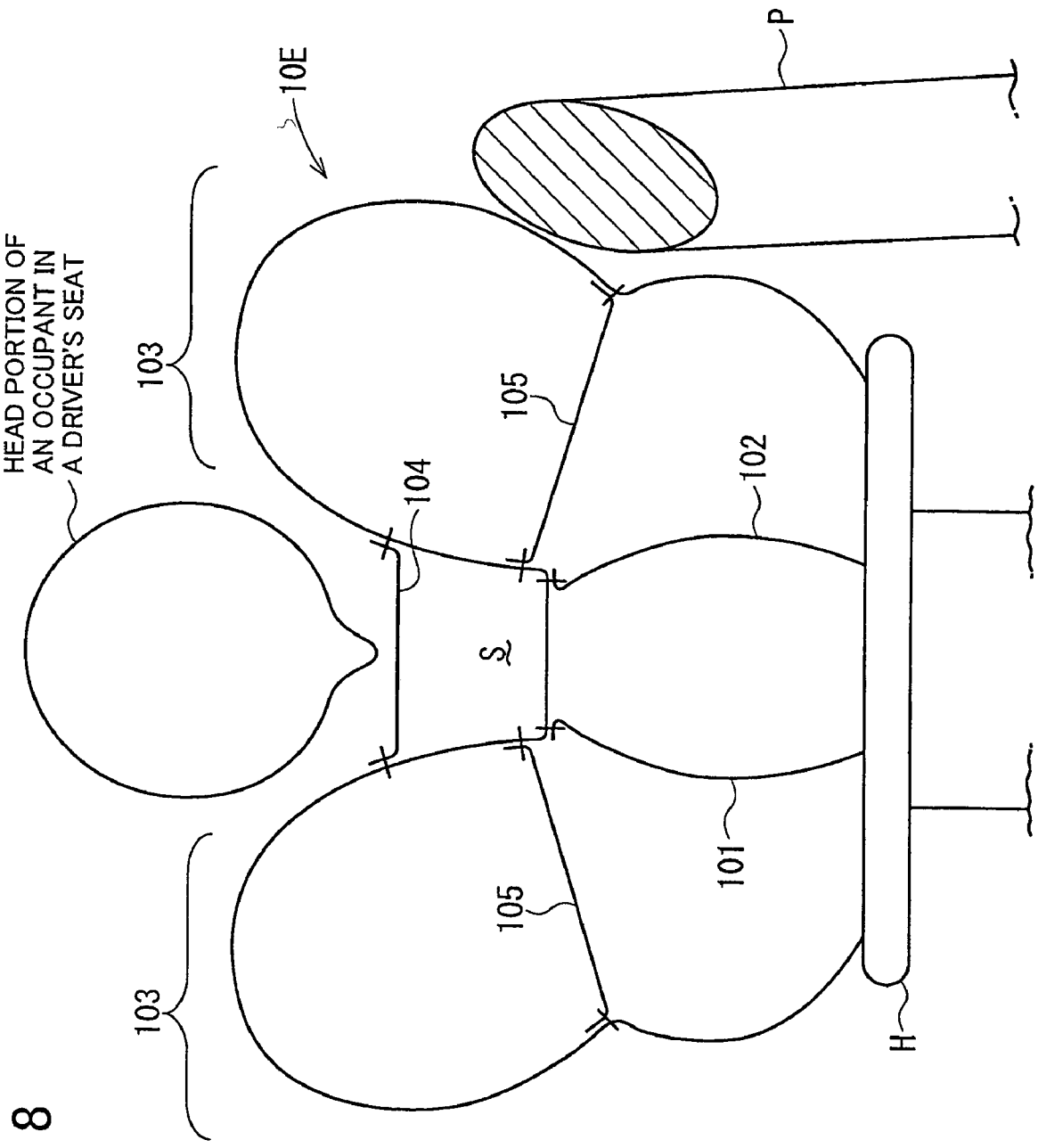
FIG. 8 is a schematic plan view of an airbag and an airbag apparatus according to a sixth embodiment of the invention, and illustrates the vicinity of a driver's seat of a motor vehicle when the airbag is expanded.

FIG. 8 is a schematic plan view in the vicinity of the driver's seat of the motor vehicle, when the airbag is expanded, showing the airbag and the airbag apparatus with respect to a sixth embodiment of the invention. Incidentally, the airbag and an A-pillar are shown in a cross-section in a horizontal plane in this figure.

In this embodiment, the airbag apparatus is also an airbag apparatus for use in a driver's seat which is attached to a steering wheel H of a motor vehicle, and when a crash of the motor vehicle is detected, the inflator (not shown) is activated to blow out gas, and the airbag 10E is expanded by means of the gas released from the inflator and starts to expand from the steering wheel H toward the occupant in the driver's seat.

In the airbag 10E, a portion in the vicinity of a center of a face facing the occupant at a time of expansion of the airbag is also connected to the vicinity of the center of a rear side face of the air bag 10E (the side opposite to a face facing the occupant, namely a face of the steering wheel H side) by means of two tethers, 101 and 102, which are strung across portions in an inner part of the airbag 10E approximately in parallel with each other. Accordingly, when the airbag 10E is expanded, the vicinity of the center of the face facing the occupant is stretched by means of the tethers, 101 and 102, and caves in toward the rear side resulting in forming the concave portion S in the vicinity of the center of the face facing the occupant.

In this embodiment, shown in FIG. 8, when the airbag 10E is in a state of expansion, the concave portion S faces a head portion of the occupant seated in a usual seating position of the driver's seat. A portion in the peripheral portions 103, which is located nearer a side-face side (door side) of the vehicle cabin than the concave portion S, starts to expand up to an oblique front area of the head portion of the occupant seated in the driver's seat. The airbag 10E is interposed between the head portion of the occupant seated in the driver's seat and an A-pillar P located at an oblique front of the driver's seat. (Namely, the airbag 10E fills up the space between the head portion of the occupant seated in the driver's seat and the A-pillar P.). Thus, the sixth embodiment is constructed.

As shown in FIG. 8, in this embodiment of the invention, across an entire periphery of the airbag 10E, an expanding amount of the airbag 10E from the steering wheel H to the side of the occupant seated in the driver's seat at the time of expansion is approximately constant. At whatever angle the steering wheel is rotated, the portion in the peripheral portions 103, which is located nearer the side-face side of the vehicle cabin than the concave portion S, is configured to be inevitably interposed between the head portion of the occupant seated in the driver's seat and the A-pillar P when the airbag 10E is expanded.

Further, in the present invention, the state that an occupant seated in a driver's seat is seated in a usual seating position of the driver's seat is defined to be a state in which an occupant having an average physical frame of an adult is seated in the driver's seat and is reclining his or her back on a backrest of the driver's seat.

In this embodiment, a covering lid panel 104 is provided in a manner so as to traverse across (substantially occlude) the concave portion S in a state of the airbag 10E being expanded. The covering lid panel 104 is disposed at a position intruding toward a back side of the concave portion S at a predetermined distance from the entrance side of the concave portion S (farthest end side of the peripheral portion 103 at a time when the airbag 10E is expanded). In addition, the covering lid panel 104 is similar to the covering lid panel 15 in the first and second embodiments described earlier.

Further, in this embodiment, in an inner part of the airbag 10E, a tether 105 for limiting an expanding amount of the peripheral portion 103 in a lateral direction when the peripheral portion 103 is expanded is provided. The tether 105 is similar to the tether 72 in the embodiment shown in FIG. 3. As shown in FIG. 8, the tether 105 connects the center side of the concave portion S of the peripheral portion 103 with the outer periphery side of the airbag 10E.

Other portions of the construction of this embodiment are similar to those of the respective embodiments described earlier. Further, the action of the airbag apparatus of this embodiment is also similar to that of the airbag apparatus of the respective embodiments described earlier.

In this embodiment, when the airbag 10E is expanded, a concave portion S is formed at a center of the airbag 10E, and in the peripheral portions 103, the portion located nearer the side-face side of the vehicle compartment than the concave portion S is interposed between the head portion of the occupant seated in the driver's seat and the A-pillar P located at the oblique front of the driver's seat (i.e., fills up the space between the head portion of the occupant seated in the driver's seat and the A-pillar P). Consequently, even when the head portion of the occupant seated in the driver's seat is moved toward the A-pillar P side when the motor vehicle encounters a crash (especially, an oblique front crash), the head portion of the occupant is received by means of the peripheral portion 103 of the expanded airbag 10E, and the head portion of the occupant is thereby prevented or restrained from hitting the A-pillar.

Incidentally, as described above, it is necessary to enlarge an expanding amount of the peripheral portion 103 toward the occupant side, up to a considerable size so that the peripheral portion 103 of the expanded airbag 10E is interposed between the head portion of the occupant seated in the driver's seat and the A-pillar. As a result, the airbag 10E is brought to a state of appearing to have a large volume. However, in practice, since the concave portion S is formed in the airbag 10E when expanded, the volume of the gas for expanding the airbag to be released from the inflator, is decreased to the extent of the concave portion S. Accordingly, in this embodiment, the airbag 10E can also be rapidly expanded without employing an excessively high-output inflator.

Each of the embodiments described above is illustrative of the present invention and the invention is not to be construed as limiting each of the embodiments described above.

For example, although in the embodiment described above, the covering lid panel that traverses the concave portion is separately provided from the front panel, the covering lid panel and the front panel may be integrally formed in a series manner. In addition, in the present invention, the panel of the airbag can be arbitrarily configured and any panel-configuration can be employed.

In the present invention, the concave portion may be provided at a position other than the center portion of the front panel and may be provided at a plurality of positions.

In the first, and the third to the fifth embodiments described above, the tether 70 for limiting the expansion amount of the peripheral portion of the airbag toward the occupant side, and/or the tether 72 for limiting the expansion amount of the peripheral portion of the airbag in the lateral direction, may also be provided.

While each of the embodiments of the present invention has been described with reference to a specific embodiment of the airbag and the airbag apparatus for use in the driver-side seat of the motor vehicle, the present invention is applicable to various kinds of airbag and airbag apparatus for protecting the occupant, other than in a driver-side seat.

The disclosure of Japanese Patent Applications No. 2005-033275 filed on Feb. 9, 2005 and No. 2006-008863 filed on Jan. 17, 2006 are incorporated herein.

What is claimed is:

1. An airbag comprising:
   a front panel for facing an occupant;
   a rear panel opposite the front panel, wherein, when the airbag is expanded, at least one part of the front panel is caved from a peripheral portion of the airbag in a direction so as to be spaced from the occupant to form a concave portion;
   a traverse panel traversing the concave portion, and
   an internal bag connecting a deepest section of the concave portion to the rear panel.

2. The airbag according to claim 1, wherein the traverse panel traverses the front panel at a position closest to the occupant.

3. An airbag comprising:
   a front panel for facing an occupant,
   a rear panel opposite the front panel connected to the front panel,
   first tethers spaced apart from each other and connected between a vicinity of a center of the front panel and a vicinity of a center of the rear panel so that when the airbag is expanded, the center of the front panel is caved from a peripheral portion of the airbag in a direction so as to be spaced from the occupant to form a concave portion having a concave portion face and a peripheral portion surrounding the concave portion,
   a lid panel connected to the concave portion face at a middle position between an entrance side of the concave portion and a deepest point of the concave portion so that the concave portion face is entirely spaced apart, and
   second tethers connecting the concave portion face adjacent a deepest point of the concave portion to a side face of the airbag so that the concave portion is surrounded by the peripheral portion annularly.

4. An airbag apparatus comprising:
   an airbag capable of being expanded in a direction facing an occupant of a motor vehicle; and
   a gas generator for expanding the airbag, wherein the airbag is the airbag according to claim 3.

5. The airbag apparatus according to claim 4, wherein the airbag apparatus is for use in a driver-side seat of a motor vehicle.

6. The airbag apparatus according to claim 5, wherein the motor vehicle comprises an A-pillar located in front of the driver-side seat, and when the airbag is in a state of being expanded, at least one of the peripheral portions of the airbag is interposed between a head portion of the occupant seated in a regular seating position of the driver-side seat, and the A-pillar.

7. The airbag according to claim 3, wherein said first tethers have a length substantially corresponding to a distance between the entrance side to the deepest side of the concave portion.

8. The airbag according to claim 7, wherein said peripheral portion has an annular shape and projects outwardly from a portion where the second tethers are provided.

9. An airbag comprising:
   a front panel for facing an occupant;
   a rear panel opposite the front panel, wherein, when the airbag is expanded, at least one part of the front panel is caved from a peripheral portion of the airbag in a direction so as to be spaced from the occupant to form a concave portion;
   a traverse panel traversing the concave portion, and
   an internal chamber comprising first and second inner panels, and connecting a deepest section of the concave portion to the rear panel.

* * * * *